United States Patent [19]

Irwin

[11] Patent Number: 4,988,907

[45] Date of Patent: Jan. 29, 1991

[54] INDEPENDENT REDUNDANT FORCE MOTOR

[75] Inventor: James Irwin, Vandalia, Ohio

[73] Assignee: Lucas Ledex Inc., Vandalia, Ohio

[21] Appl. No.: 472,222

[22] Filed: Jan. 30, 1990

[51] Int. Cl.[5] .......................... H02K 1/34; H01F 7/08

[52] U.S. Cl. ...................................... 310/181; 310/29; 310/184; 335/230

[58] Field of Search ....................... 137/625.62, 625.64; 251/129.15, 129.16; 310/12, 14, 15, 29, 30, 51, 181; 335/229, 230, 266

[56] References Cited

U.S. PATENT DOCUMENTS

| | | | |
|---|---|---|---|
| 4,040,445 | 8/1977 | McCormick | 137/596.18 |
| 4,434,389 | 2/1984 | Langley et al. | 318/138 |
| 4,550,267 | 10/1985 | Vaidya | 310/184 |
| 4,631,430 | 12/1986 | Aubrecht | 310/12 |
| 4,682,135 | 7/1987 | Yamakawa | 335/230 |
| 4,710,656 | 12/1987 | Studer | 310/51 |
| 4,796,664 | 1/1989 | Toews | 137/595 |
| 4,847,581 | 7/1989 | Mohler | 335/229 |

FOREIGN PATENT DOCUMENTS

| | | |
|---|---|---|
| 2111755A | 6/1983 | United Kingdom . |
| 2214001A | 8/1989 | United Kingdom . |

*Primary Examiner*—Steven L. Stephan
*Assistant Examiner*—D. L. Rebsch
*Attorney, Agent, or Firm*—Nixon & Vanderhye

[57] ABSTRACT

A force motor having four magnetic lanes arranged annularly around an axially movable central shaft, where the shaft is connected to an armature which also moves axially with the shaft within a gap located between two coils forming each lane of the motor. The four magnetic lanes are electrically and magnetically independent and provide three levels of safety-redundancy in case of coil failure.

25 Claims, 5 Drawing Sheets

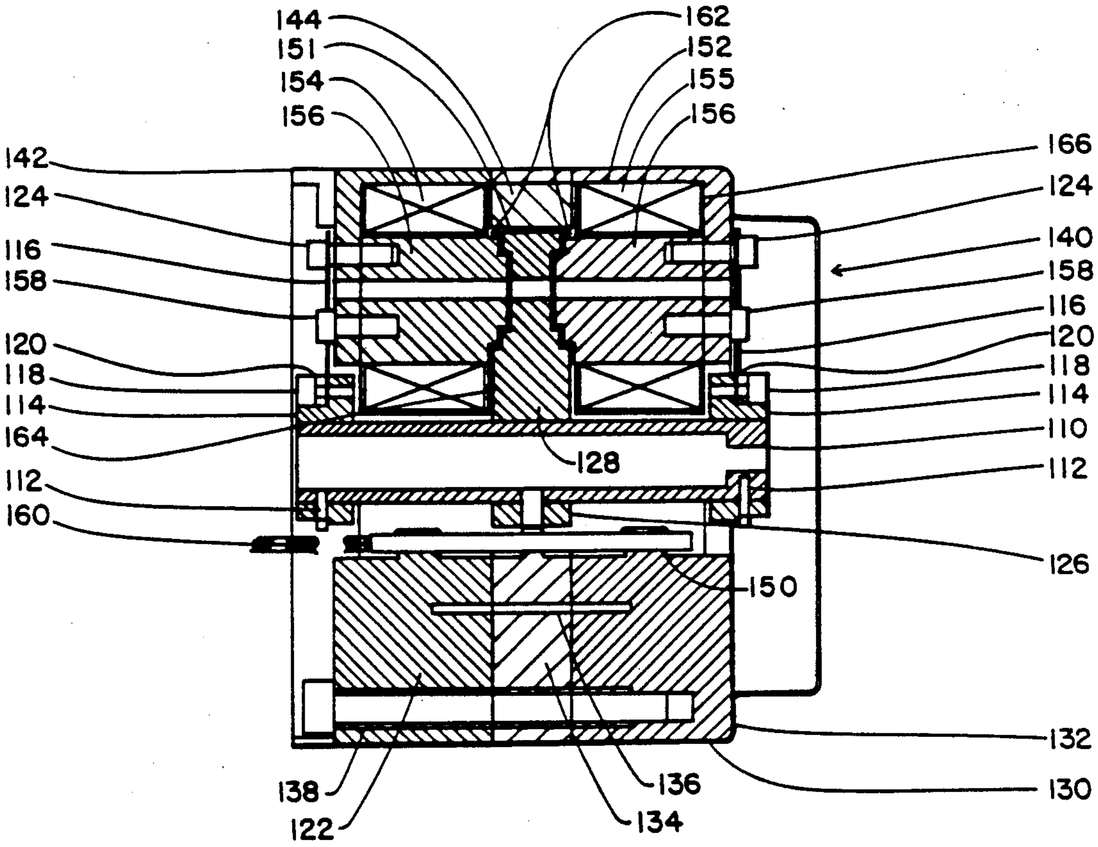
F/G. 3
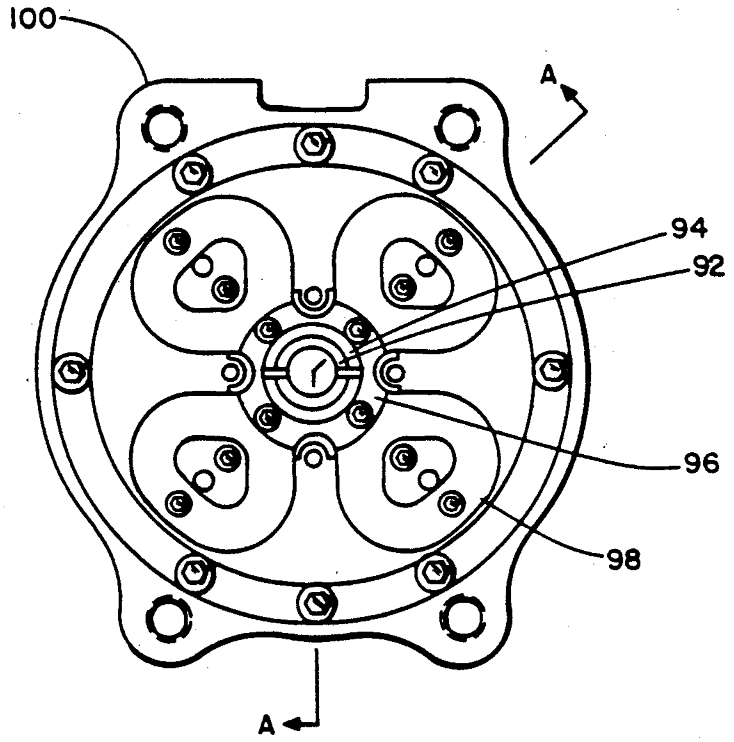
F/G. 4

INDEPENDENT REDUNDANT FORCE MOTOR

BACKGROUND OF THE INVENTION

1. Field of the Invention

The invention relates generally to electrical solenoids that produce a linear, axial force, and, more specifically, to that class of electrical solenoids known as force motors which produce a relatively short displacement which is proportional to a driving current.

2. Description of the Prior Art

Solenoids are generally characterized by an actuation direction which does not change with regard to the direction of the energizing current. In other words, if a direct current supply has its polarity reversed, the solenoid still provides axial movement in the same direction.

Force motors are distinguished from solenoids in that they use a permanent magnet field to pre-bias the air gap of a solenoid such that movement of the armature of the force motor is dictated by the direction of current in the coil. Reversal of the polarity of current flow will reverse the direction of the force motor armature displacement.

Force motors are frequently used to drive a valve spool in a high performance aircraft where efficiencies of weight, size, cost and power consumption are of prime consideration. It is, therefore, advantageous to minimize losses associated with producing high magnetic forces and to minimize the size of the permanent magnets which normally have relative costs higher than the solenoid iron.

FIG. 1 in the present application illustrates a conventional force motor with a simplified construction for ease of explanation. A stator 10 includes mounting brackets 12 and an iron core which provides a path for flux travel. The armature 14 is mounted on and moves with output shaft 16. Included in the stator mount is permanent magnet 18 which generates a flux flow through the stator and the armature as indicated by the solid line arrows 20. This flux from magnet 18 travels in opposite directions across air gaps 22 and 24. Coils 26 and 28 are provided and are wound so as to provide flux flow paths indicated by dotted line arrows 30 which cross air gaps 22 and 24 in the same direction. Operation of the prior art force motor provides an output movement by shaft 16 when current in one direction is provided to coils 26 and 28 and movement of the output shaft in the opposite direction when the opposite current flow is provided to coils 26 and 28. This movement direction is caused by the fact that, as shown in FIG. 1, flux flow generated by the permanent magnet 18 (shown by solid line arrows 20) is in the same direction as coil generated flux flow (indicated by dotted line arrows 30) across air gap 22, but in an opposite direction across air gap 24. This causes a greater attraction at air gap 22 than would exist at air gap 24, and, thus, the armature is attracted towards the left-hand stator portion moving the output shaft to the left. Obviously, if the current flow in both coils 26 and 28 were reversed, the direction of the coil generated flux flow paths shown by dotted line arrows 30 would be reversed for both air gaps 22 and 24. It is noted that the permanent magnet 18 can be mounted in the stator assembly, as shown, or may be part of the armature.

If the coil generated flux flow were reverse (by winding the coil differently or merely reversing the polarity of the direct current supply) the flux flow would be cumulative across air gap 24 and differential across air gap 22, resulting in the armature movement to the right and consequent output shaft movement to the right. Air gaps 22 and 24 are designated working air gaps in which the flux passes through an air gap and, as a result, generates an attractive force between the stator and armature which is in the axial direction. The prior art force motors also have an additional air gap 32 which may be characterized as a non-working air gap in flux flow in the radial direction; and thus, even though there is an attraction between the stator and armature, this does not result in any increase in force in the axial or operational direction of the force motor. In order to maximize flux flow (minimizing air gaps). this dimension is made as small as possible (minimizing reluctance of the flux flow path), although a sufficient clearance must be maintained to allow for relative movement between the stator and armature.

Another force motor of the prior art is illustrated in FIG. 2. The motor 34 of FIG. 2 utilizes four coils 36, 38, 40, 42 annularly centered on shaft and armature assembly 44, which is axially slidable to the right or left. The electrical energizing of any one coil establishes lines of magnetic flux which is called a "lane", and the energizing of all four coils provides four lanes. Spacers 46, 48 and centering springs 50, 52 help keep the shaft and armature assembly 44 centered in relation to working air gaps 54 and 56 and at a constant distance from the coils 36, 38, 40, 42. Permanent magnets 58, 60 are situated between pole pieces 62, 64 and spacers 46, 48, and have both North poles facing towards each other, thus generating static flux paths 66, 68 (solid lines). When coils 36, 38, 40, 42 are all electrically energized in parallel so that they all help generate flux path 70 (dotted lines), shaft and armature assembly 44 will be shifted to the left because of the cumulative effect of permanent magnet flux path 68 and coil-generated flux path 70 across air gap 54. A reversal of electric polarity in coils 36, 38, 40, 42 causes coil-generated flux path 70 to be oriented in the reverse direction (not shown), thus adding cumulatively to static flux path 66 across air gap 56, causing shaft and armature assembly 44 to be shifted to the right.

A major advantage of the motor of FIG. 2 over that of FIG. 1 is the fact that three levels of redundancy are built into the motor of FIG. 2, while the motor of FIG. 1 has none. If one, two or three of the coils of the motor of FIG. 2 fail, the remaining coil[s] can effectively actuate the shaft and any associated spool valve, if the coils are electrically connected to parallel drivers. The motor of FIG. 1, on the other hand, with only two serially-connected coils cannot provide any extra levels of redundancy.

There are a number of drawbacks to the motor of FIG. 2. First, the magnetic circuits of each coil share the same core structure so that voltage transients caused by a malfunction in one coil can induce undesirable voltages through the other coil[s], causing instability and erratic performance. Second, heat generated by shorted coils may be transferred to adjacent coils causing deteriorating performance and/or additional coil failure. Third if only a single energized coil on one end is energized, asymmetrical flux may be generated through the respective air gaps, resulting in asymmetrical attractive forces acting upon the armature through the respective air gaps, depending upon coil polarity.

Fourth, continued stacking of coils to increase the redundancy safety factor causes the length and weight of the motors to increase prohibitively, especially in aircraft use where space and weight are at a premium. Fifth, the motor of FIG. 2 uses a magnetically soft material between the working air gap and the magnet, causing the flux path in the gap to be less defined.

Therefore, there exists a need in the art for a multilane force motor possessing several layers of redundancy which provides symmetrical moving forces upon the moving parts during multilane failure, and which electrically and magnetically isolates all lanes in case of a coil short circuit or open circuit.

SUMMARY OF THE INVENTION

It is an object of the present invention to provide a force motor which has a plurality of lanes which are electrically and magnetically independent.

It is an additional object of the invention to arrange the lanes of a force motor in a physical structure where each lane is effectively insulated from the heat generated by the other lanes.

It is still a further object of the invention to provide a multilane force motor which can produce a symmetrical flux and therefore exert symmetrical attractive forces upon the armature in either direction, regardless of the number or the location of failed lanes.

It is still a further object of the invention to provide a force motor which stacks the coils annularly around the movable shaft instead of stacking them axially or in line, so as to shorten the length of the motor.

It is another object of the invention to provide a force motor which eliminates the need for magnetically soft material between the working air gaps and the magnets thereby producing a more clearly defined flux through the air gaps and a resulting higher efficiency.

The above and other objects are achieved in accordance with the present invention by providing a force motor having the magnetic lanes arranged annularly around an axially movable central shaft, where the shaft is connected to an armature which also moves axially with the shaft within a gap located between two coils forming each lane of the motor. Three permanent magnets per lane are used which are fixedly secured to the housing of the motor and which generate a set of static flux paths through the armature and associated magnetic material. The coils in each lane, when electrically excited, generate a flux path in one of two directions which, in one direction, jumps a working air gap to pull the armature and shaft in one direction; while, when the coils are excited in a reverse polarity, the generated flux reverses direction and combines with the static flux in a way which causes the armature and the shaft to move in the other direction. In a preferred embodiment four magnetic lanes, which are arranged in a "quad" arrangement around the central shaft in the present invention, are electrically and magnetically independent and, therefore, the effect of shorted coils or open coils in each lane have no effect on the other three remaining lanes. Consequently, a force motor with three levels of safety redundancy producing a symmetrical, stable, attractive force on the shaft in either axial direction can be achieved.

BRIEF DESCRIPTION OF THE DRAWINGS

The present invention will be better understood by reference to the following exemplary drawings wherein:

FIG. 3 is a sectional side view of a force motor according to the present invention taken along section A—A of FIG. 4, where the upper section is a section through the center of one lane while the lower section shows a section between lanes;

FIG. 4 is a an end view of a force motor in accordance with the present invention;

FIG. 7(*b*) is a sectional side view of the magnet assembly of the force motor in accordance with the present invention taken along section A—A of FIG. 7(*a*);

FIG. 8(*b*) is a sectional side view of the armature and shaft of the force motor in accordance with the present invention taken along section A—A of FIG. 8(*a*);

DETAILED DESCRIPTION OF THE PREFERRED EMBODIMENTS

Figure 1:
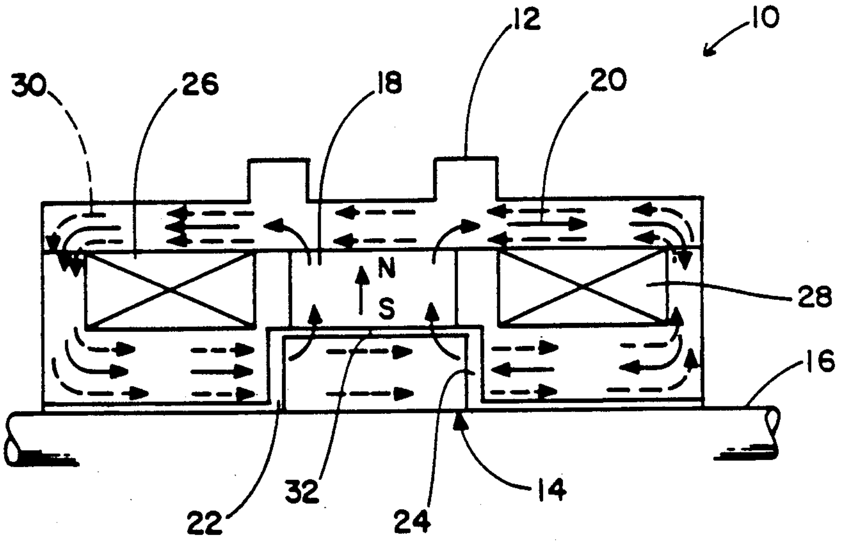
FIG. 1 PRIOR ART
FIG. 1 is a schematic illustration of flux flow in a conventional prior art force motor.

FIGS. 3 through 6 illustrate various sectional views of one embodiment of the present invention. FIG. 3 illustrates shaft 110 passing through housing 122 and secured to shaft ends 114 at either end by pins 112. Each shaft end 114 is secured to spring plate 116 by bolts 118 passing through spring cover 120. As shown in FIG. 4, spring plate 116 has radially extending arms which supply an alignment and centering action upon shaft 110, and the arms are secured near the periphery of housing 122 by core and spring bolt 124. Since there is a spring plate 116 at either end of shaft 110, shaft 110 is held at a static equilibrium position when there is no external axial force applied to shaft 110.

Figure 5:
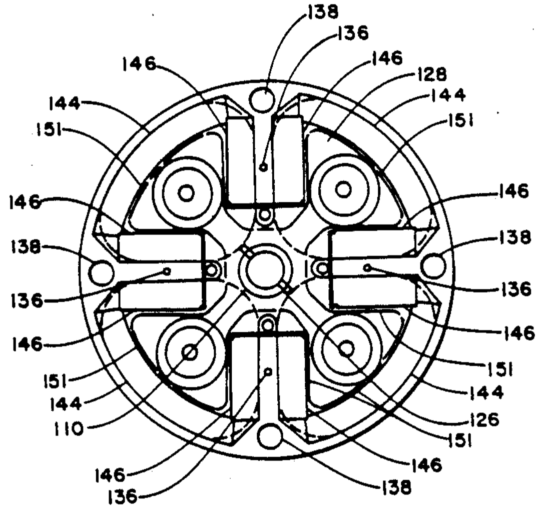
FIG. 5 is a sectional end view of a force motor in accordance with the present invention showing the armature and magnets.
Figure 8:
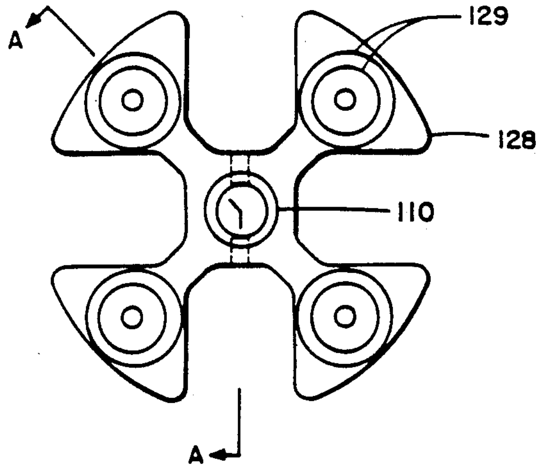
FIG. 8(*a*) is a an end view of the armature and shaft of the force motor in accordance with the present invention.
Figure 8:
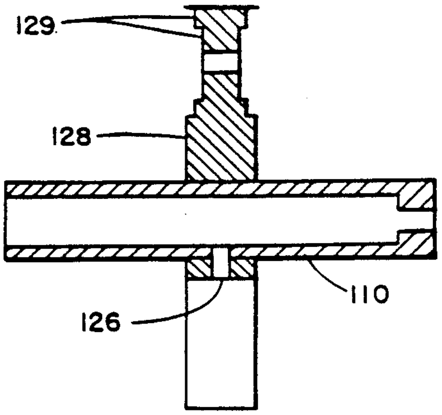

Referring back to FIG. 3, armature 128 is secured to a midpoint of shaft 110 by pins 126. In a preferred embodiment, armature 128 is preferably constructed of a highly-permeable composition of 2% vanadium, 49% cobalt and 49% iron, which is well known in the art to carry more flux per unit area than carbon steel As shown in FIGS. 5 and 8(*a*), armature 128 has a "cloverleaf" shape where there is one extended arm for each lane of the motor. As shown in FIG. 8(*b*), in a preferred embodiment of the invention, the outer portion of each arm has a stepped thickness 129 where flux paths go into or out of armature 128.

Referring back to FIG. 3, housing 122 of the motor is made up of stator sections 130,132, separated by ring gap 134, all of which are constructed of low carbon steel in a preferred embodiment. As shown in FIG. 3, these component parts are aligned during assembly by using small dowels 136 and larger sleeve dowels 138. The sleeve dowels 138 are bolts that hold these elements securely together as they are assembled around shaft 110 and armature 128. One end of housing 122 is enclosed by cover 140, while the other is secured to an aluminum mounting flange 142.

Figure 7:
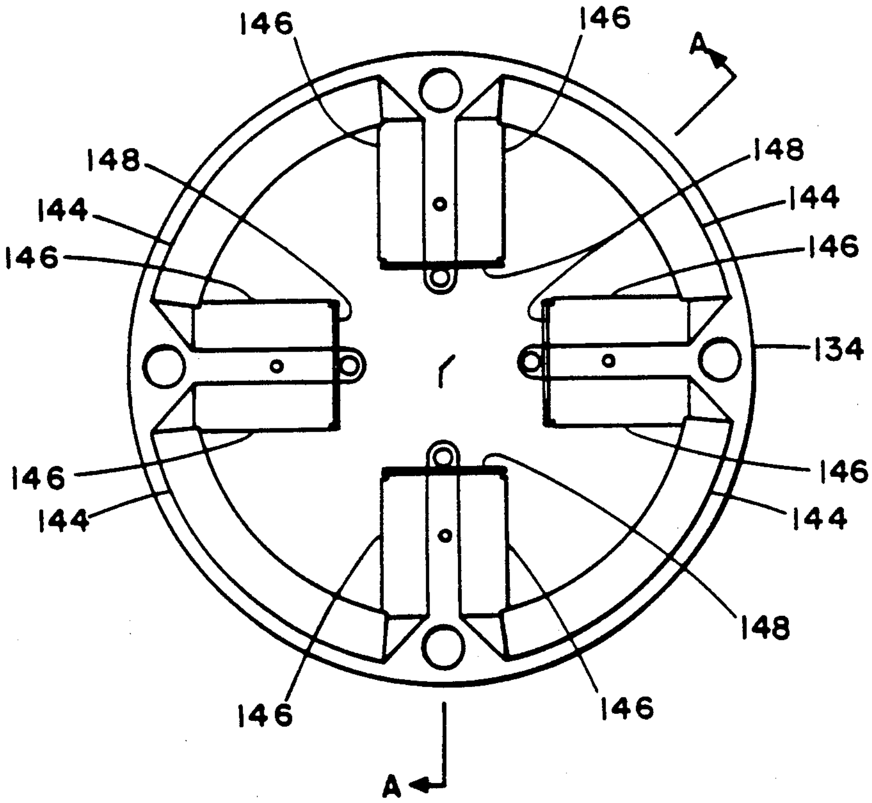
FIG. 7(*a*) is an end view of the magnet assembly of the force motor in accordance with the present invention.
Figure 7:
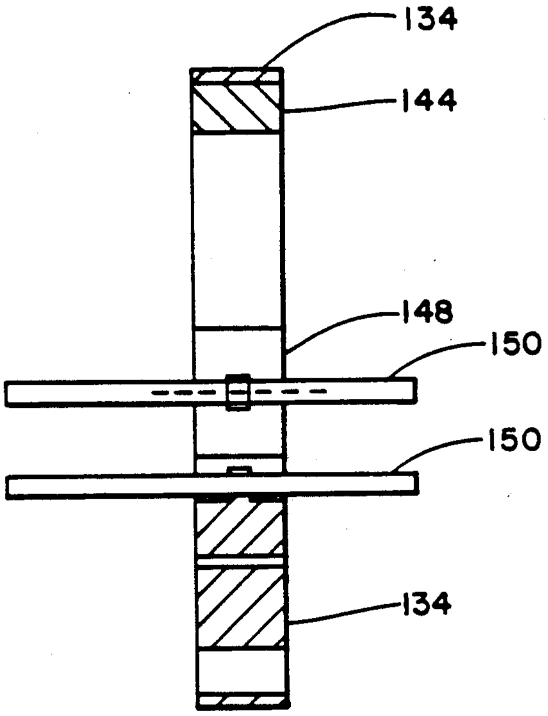

Also located within housing 122 are arc-shaped permanent magnets 144 and bar-shaped permanent magnets 146, securedly epoxied to ring gap 134 in the locations shown in FIGS. 5 and 7*a* to form a substantially closed magnetic field in the shape of a torus but with an opening on one side. The magnets may be of any known permanent magnet material, but preferably samarium cobalt in a preferred embodiment. There are two bar-shaped magnets 146 and one arc-shaped magnet 144 for each lane of the motor. In order to additionally secure bar-shaped magnets 146, each one is interlocked into a ridge cut into the ends of each arc-shaped magnet 144. In addition, a stainless steel magnet guard 148 is placed over the ends of each bar-shaped magnet 146, and secured by wire guide tube 150 as shown in FIG. 7(*b*).

Each arm of armature 128 is separated from magnets 144, 146 by non-working air gap 151, as shown in FIG. 5.

Figure 6:
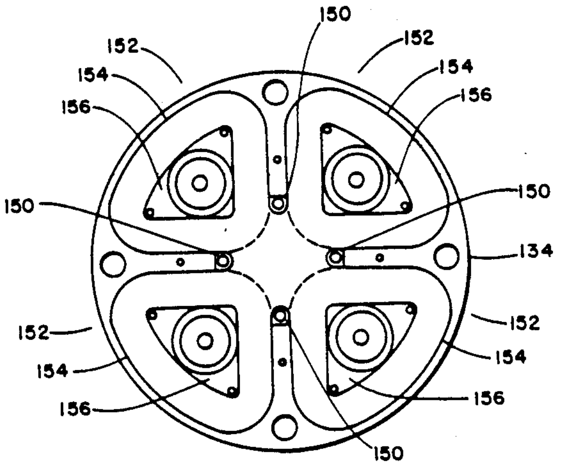
FIG. 6 is a sectional end view of a force motor in accordance with the present invention showing the ends of the coils.

As shown in FIG. 6, there are four sets of coil assemblies 152, one for each lane. As shown in FIG. 3, each coil assembly 152 is made up of two individual coils 154 and 155 which are wrapped around associated coil cores 156 and are located on either side of an associated arm of armature 128. Magnets 144, 146 are located in ring gap 134. Coil cores 156, like armature 128, are preferably constructed of 2% vanadium, 49% cobalt and 49% iron. Coil cores 156 are secured to stator sections 130,132 by core bolts 158, as shown in FIG. 3.

Individual coils 154 and 155 in each coil assembly 152 are electrically connected in series by wire 160 housed in wire guide tube 150, so that, when energized, the magnetic fluxes 210 generated by both coils 154 and 155 are oriented in the same direction, i.e., through coil cores 156, through armature 128, and across working air gaps 162 located on either side of armature between armature 128 and coil cores 156. The ends of coils 154 and 155 facing armature 128 and magnets 144, 146 are covered with non-magnetic aluminum flanges 164, while the outer ends of coils 154 and 155 are covered with magnetically permeable flanges 166 constructed of low carbon steel.

FIGS. 4, 5 and 6, taken in combination with FIG. 3 illustrate the annular arrangement of the lanes of the motor of the present invention. FIG. 4 is an end view showing shaft 110, shaft end 114, spring cover 120, the arms of spring plate 116 and aluminum mounting flange 142. FIG. 5 is a inner sectional view emphasizing armature 128, bar magnets 146, arc magnets 144, shaft 110 and pins 126 which lock the armature 128 with shaft 110.

FIG. 6 is an inner sectional view of another section of the motor showing individual coils 154 in the separate coil assemblies 152. Coils 154 are electrically connected in series and wound in the same direction as coils 155 (not shown), in order to generate a magnetic flux flowing in the same direction through both coils, depending upon current polarity. FIG. 6 also more clearly shows the inwardly-directed radial arms of ring gap 134. Wire guide tubes 150 are also shown cut away at the ends of the inwardly-directed radial arms of ring gap 134.

FIG. 7(*a*) illustrates a sectional end view of ring gap 134 showing the positions of the eight bar-shaped magnets 146 and four arc-shaped magnets 144. Bar-shaped magnets 146 and arc-shaped magnets 144 are shown epoxied to ring gap 134, and, in addition, bar-shaped magnets 146 are shown as having notches cut in their ends in order to interlock with the ends of arc-shaped magnets 144, forming air pockets between magnets 144,146 and ring gap 134. The ends of bar-shaped magnets 146 closest to shaft 110 are shown covered with magnet guards 148. Radially inwardly extending arms of ring gap 134 to which bar-shaped magnets 144 are epoxied extend through a hole in each magnet guard 148 and have another hole drilled through each of their respective ends. Through this hole is inserted wire guide tube 150 containing wire (not shown) for coil assembly 152 as shown in FIG. 7(*b*), which also helps hold bar-shaped magnets 146 securely against arc-shaped magnets 144.

FIG. 8(*a*) is an end view of an assembly made up of armature 128 and shaft 110. FIGS. 8(*a*) and 8(*b*) show step-wise indentations 129 in the construction of the arms of armature 128, which allow a more preferred flux path through working air gaps 162 as shown in FIG. 3.

FIG. 8(*b*) also shows how pin 126 securely connects shaft 110 with armature 128. The arms of armature 128 which are adjacent to coil cores 156 in FIG. 3 contain holes, as do coil cores 156 and stator sections 130 and 132 for alignment of these internal parts.

Figure 9:
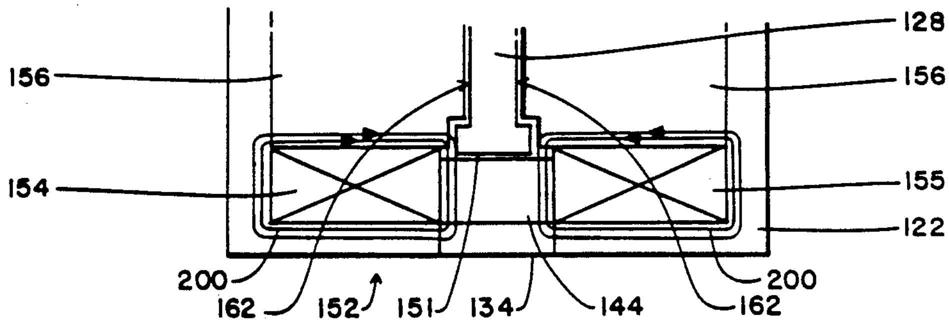
FIG. 9 is a simplified partial sectional schematic side view of a portion of one lane of the force motor in accordance with the present invention showing static magnetic flux lines produced by a magnet with North pole facing outwardly.

FIG. 9 illustrates a portion of one lane of the force motor of the present invention in a de-energized position whereby armature 128 is slidably positioned midway between opposing coils 154 and 155 in a coil assembly 152 in one lane of the motor. One arc-shaped magnet 144 and two bar-shaped magnets 146 (not shown in FIG. 9) in each lane set up a static magnetic flux path (solid line arrows) 200 in each lane. The polarity of magnets makes no difference except that all polarities in each of the lanes should be the same. In other words, arc-shaped magnet 144 and two bar-shaped magnets 146 in a given lane should all have their North poles either facing radially outwardly or radially inwardly with respect to the axis of that lane. The polarity of the sets of magnets 144,146 for the four lanes do not have to be identical because a reversed pole polarity in the magnets 144,146 of one lane can produce the same direction of armature 128 and shaft 110 movement as the other lanes if the polarity of coil assembly 152 of the one lane is also reversed from the polarity of coil assembly 152 in the other lanes.

In a given lane, as shown at the bottom of FIG. 9, if the North pole of the set of magnets 144,146 is facing outwardly, a static magnetic flux path 200 is set up whereby the flux lines leave the North pole end of magnets 144,146, flow into housing 122 of the motor towards either end, flow back into the associated coil cores 156 for that lane, across the two working air gaps 162 on either side of armature 128, through armature 128, through the non-working air gap 151 associated with that lane section, and back into the South pole end of the magnet 144,146 set for that lane. In this position, the spring plates 116 located on either end of shaft 110 tend to hold shaft 110 and armature 128 assembly directly in the center of coils 154 making up the coil assembly 152 for each lane. This static flux path 200 description is similar for all four lanes in the motor.

Figure 10:
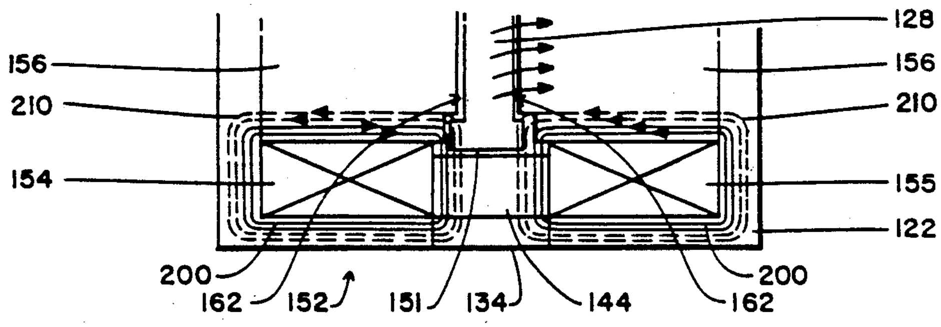
FIG. 10 is a simplified partial schematic side view of a portion of one lane of the force motor in accordance with the present invention showing the addition of the flux generated by the coils pulling the armature to the right (armature is not shown shifted).

FIG. 10 illustrates a portion of one lane of an energized force motor where armature 128 is attracted to the right by the additive effect of the static flux path 200 of FIG. 9 combined with an electrically excited coil generated flux path 210 (dotted line arrows) which reinforces the static flux path 200 (solid line arrows) across right-hand working air gap 162, thus attracting armature 128 to the right. Although static flux path 200 through coil core 156 on the left still remains, its attractive effect upon armature 128 and shaft 110 across working air gap 162 on the left is cancelled at least partially by the flux path 210 generated by the electrically excited coil 154 on the left, which flows in an opposite direction. Therefore, there is a reduction in net attractive force across left-hand working air gap 162 while there is an increased attractive force across right-hand working air gap 162 caused by the net sum of the generated flux path 210 and the static flux path 200 across that gap 162. Although FIG. 10 does not show the actual displacement, the effect of this is a net attraction and displacement of the armature 128 to the right.

A reversal of pole polarities causes the opposite situation to occur whereby the flux paths across the right-hand working air gap 162 cancel out, while the flux paths across the left-hand working air gap 162 add together in order to attract the armature 128 to the left.

It should be noted that coils 154 and 155 of coil assemblies 152 in a preferred embodiment of the present invention are triangularly-shaped as shown in FIG. 6. Triangularly-shaped coils 154 and 155 consume a smaller volume of space than do circular coils having the same number of turns of wire; therefore, they are able to generate an amount of flux, otherwise provided by larger circular coils or greater current flow. The triangularly-shaped coils 154 and 155 also reduce the dead area between the coils, resulting in a reduction of the formation of eddy currents and hysteresis losses, thus improving the overall performance of the motor.

The motor of the present invention was designed in order to provide a force motor for critical aircraft applications in which several levels of redundancy were to be provided by supplying independent magnetic lanes to power the motor. The lanes are independent in that the electrical and magnetic fluxes and fields generated by any one lane have no effect on any of the others and vice versa. In contrast, the motor of the prior art in FIG. 2 has all four coils sharing the same structure and magnetic circuit.

Figure 2:
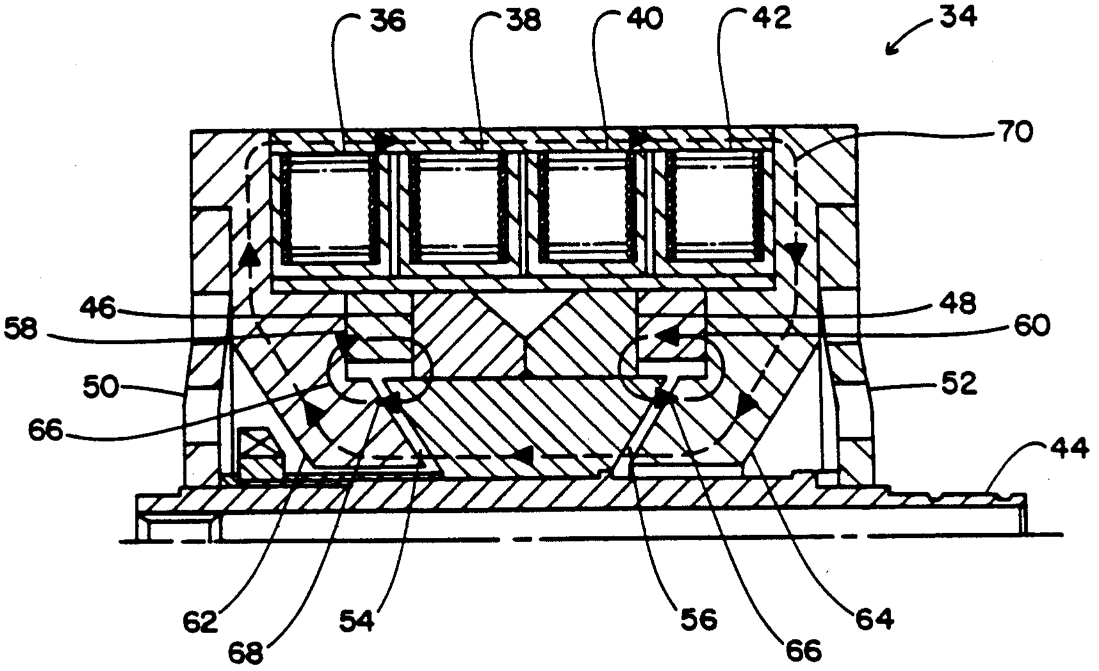
FIG. 2 PRIOR ART
FIG. 2 is a schematic illustration of flux flow in an in-line four-lane prior art force motor.

In the FIG. 2 embodiment, heat from a shorted coil in one lane is easily transferred to the other coils causing additional failure and/or deteriorating coil or lane performance. However, since the lanes arranged in the "quad" construction of the present invention are structurally and magnetically independent, heat generated from a shorted coil is contained in the lane containing the coil, and the coils in a given lane are prevented from inducing voltages in the coils of the other lanes.

Another advantage of the present invention has to do with its inherently higher magnetic damping characteristics. Since the motor of the present invention utilizes magnets directly opposite the armature with no intervening soft magnetic material in between, the armature moves in a resulting sharply-focused, well-defined magnetic field which tends to provide a maximum magnetic motional damping. Lines of flux emanating directly from the magnet into the armature are stiffer than they would be if there were intervening permeable magnetic material in between. Therefore, the lines of flux are more resistant to bending as the armature moves back and forth, which creates a high level of motional damping.

Another advantage is the fact that the "cloverleaf" (four arm) design of the armature in the present invention provides a very low moving mass for the forces and power generated in the motor. This results in a motor with a very high natural frequency response, i.e., frequency response meaning how quickly the motor can respond to back and forth coil polarity reverses to provide opening and closing of aircraft spool valves, which may need to be operated hundreds of times a second for critical aircraft control.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A redundant force motor having an axis of operation in an axial direction, said force motor comprising:

a housing including a stator assembly, said stator assembly comprising a plurality of pairs of coil cores;

an armature including a shaft movable in said axial direction and having a plurality of armature sections, each section having two sides in said axial direction, each of said pairs of coil cores having one core located on each side of each associated armature section, and end of each said coil core and its associated armature section defining two working air gaps in said axial direction;

static biasing means for generating static magnetic flux through said working air gaps associated with each of said armature sections;

a plurality of energizable coil means, each of said coil means comprising means for generating an electromagnetic flux through said working air gaps associated with one of said armature sections, one of said static biasing means flux and said energizable coil means flux passing in the same axial direction through said two working air gaps associated with one armature section, and the other of said static biasing means flux and said energizable coil means flux passing in opposing axial directions through said two working air gaps associated with said one armature section, said energizable coil means flux in said one armature section is independent of flux generated by said energizable coil means flux in another armature section.

2. The force motor of claim 1, wherein said motor has four armature sections

3. The force motor of claim 1, wherein said plurality of sections extend radially outward from said shaft of said armature.

4. The force motor of claim 1, wherein said static biasing means further comprises a plurality of permanent magnets 5. A redundant force motor having an axis of operation in an axial direction, said force motor comprising:

a housing including a stator assembly, said stator assembly comprising a plurality of pairs of coil cores;

an armature including a shaft movable in said axial direction and having a plurality of armature sections, each section having two sides in said axial direction, each of said pairs of coil cores having one core located on each side of each associated armature section, an end of each said coil core and its associated armature section defining two working air gaps in said axial direction;

static biasing means for generating static magnetic flux through said working air gaps associated with each of said armature sections;

a plurality of energizable coil means, each of said coil means comprising means for generating an electromagnetic flux through said working air gaps associated with one of said armature sections, one of said static biasing means flux and said energizable coil means flux passing in the same axial direction through said two working air gaps associated with one armature section, and the other of said static biasing means flux and said energizable coil means flux passing in opposing axial directions through said two working air gaps associated with said one armature section, wherein each said coil means comprises two coils electrically connected in series.

6. The force motor of claim 5, wherein both said coils making up each said coil means are wound in the same direction.

7. The force motor of claim 1, wherein said coil cores and said armature are constructed of a composition comprised substantially of 2% vanadium, cobalt and 49% iron.

8. A force motor having an axis of operation, said force motor comprising:

a housing, further comprising a stator assembly and four pairs of coil cores;

an armature including a shaft movable in an axial direction, said armature having four sections, a coil core being located on either side of each associated armature section, an end of each coil core and its associated armature section defining a working air gap;

four permanent magnet means for generating a plurality of static magnetic flux paths through said working air gaps, each permanent magnet means, associated with a respective one of said armature sections, generating a magnetic flux path through said working air gaps associated with said one of said armature sections in opposing axial directions;

four coil means, each coil means being associated with a pair of coil cores and associated armature section, wherein each of said coil means further comprises a means for generating at least one electrically excited magnetic flux path, whereby the direction of said electrically excited magnetic flux path is dependent upon the polarity of an electrical current flowing through said associated coil means and is in the same axial direction across the working air gaps for each armature section and its associated coil cores.

9. The force motor of claim 8, wherein said electrically excited flux paths associated with each coil means are electrically and magnetically independent.

10. The force motor of claim 9 wherein said coil means are annularly arranged around said shaft and wherein said electrically excited flux paths in said coil means act in parallel to generate axial magnetic forces upon said armature.

11. The force motor according to claim 8, wherein said cores and said armature are constructed of an alloy comprised substantially of 2% vanadium, 49% cobalt and 49% iron.

12. The force motor of claim 8, wherein each said coil means comprises two coils electrically connected in series.

13. The force motor of claim 8, wherein said magnet means are located in close proximity to said armature sections across an air gap.

14. A force motor having an axis of operation, said force motor comprising:

a housing, further comprising:

a stator assembly comprising a first section and a rear section;

a plurality of coil cores;

a ring gap assembly located between said sections of said stator assembly;

a central shaft located in the center of said housing and slidably movable in either of two axial directions;

an armature fixed to a midsection of said shaft, said armature having a plurality of sections extending radially outwardly from said shaft toward an outer portion of said ring gap, each section having an axis parallel to and displaced from an axis of said central shaft, wherein each said armature section and associated coil core located on either side of said armature section defines a pair of working air gaps;

a biasing means located radially inwardly of said ring gap and outwardly of said armature sections, said biasing means and each said armature section defining an associated non-working air gap, said biasing means generating two static magnetic flux paths for each armature section, said paths emanating from said biasing means and passing through an outer portion of said ring gap, an outer portion of said stator, said coil cores associated with said armature section, across said working air gaps associated with said armature section, through said armature section, and across said non-working air gap associated with said armature section back into said biasing means; and a plurality of coil means, having their respective axes arranged annulary around and parallel to said shaft, there being a one-to-one correspondence between each coil means and each said armature section, wherein each said coil means further comprises:

two component coil means, located proximally on either side of a respective armature section and encircling said coil cores associated with each armature section for generating an electrically excited magnetic flux path passing through said biasing means, an outer portion of said ring gap, an outer portion of said stator, said coil core associated with said armature section, across said working air gap associated with said armature section, through said armature section and across said non-working air gap associated with said armature section to said biasing means whereby the direction of said electrically excited magnetic flux path depends upon the polarity of an electrical current flowing through said component coil means and is independent of excited magnetic flux of any other armature section.

15. A force motor according to claim 14, wherein said motor contains four said coil means, said coil means generating said electrically excited flux paths which are electrically and magnetically independent for each said coil means.

16. A force motor according to claim 14, wherein said biasing means comprises a plurality of permanent magnets.

17. A force motor according to claim 14, wherein said component coil means associated with each said coil means are electrically connected in series.

18. A force motor according to claim 14, wherein said biasing means comprises a plurality of permanent magnets further comprising:

four arc-shaped magnets fixedly secured to an inner surface of said ring gap, and eight bar-shaped magnets located in pairs proximally adjacent to four inwardly projecting radial sections of said ring gap, said bar-shaped magnets securedly fixed by interlocking with a ridge cut into said arc-shaped magnets.

19. The force motor according to claim 18, wherein one arc-shaped magnet and two bar-shaped magnets, associated with each said armature section having like poles facing inwardly toward said armature section.

20. The force motor according to claim 18, wherein each said bar-shaped magnet is further secured to said ring gap by securedly fixing a rigid plate to said ring gap over the surface of each said bar-shaped magnet facing said shaft.

21. The force motor of claim 18, wherein each said component coil means has an inner end proximally adjacent to said armature covered with a flange constructed of aluminum, and an outer end covered with a flange constructed of low carbon steel.

22. The force motor of claim 14, wherein said stator sections and said ring gap are constructed of low carbon steel.

23. The force motor of claim 14, wherein said coil cores and said armature are constructed of a composition of substantially 2% vanadium, 49% cobalt and 49% iron.

24. A force motor according to claim 14, further including means for maintaining alignment of said shaft for slidable axial movement within said housing and means for retaining said armature secured to said shaft in a position midway between said associated component coil means whenever no flux is being generated by said component coil means.

25. A force motor according to claim 24, wherein said alignment means and said retaining means comprise two shaft ends secured to the ends of said shaft, each said shaft end being secured to an assembly comprising a spring cover and a central portion of a spring plate, said spring plate having arms extending outwardly and being secured to said stator.

* * * * *